bonded web.

United States Patent [19]
Fowells

[11] Patent Number: 4,644,045

[45] Date of Patent: Feb. 17, 1987

[54] METHOD OF MAKING SPUNBONDED WEBS FROM LINEAR LOW DENSITY POLYETHYLENE

[75] Inventor: R. William Fowells, Washougal, Wash.

[73] Assignee: Crown Zellerbach Corporation, San Francisco, Calif.

[21] Appl. No.: 839,655

[22] Filed: Mar. 14, 1986

[51] Int. Cl.[4] .............................................. C08F 210/00
[52] U.S. Cl. ................................ 526/348; 264/210.8; 264/DIG. 75; 428/288; 428/296; 526/348.2; 526/348.6
[58] Field of Search .................... 264/210.8, DIG. 75, 264/167; 526/348, 348.2, 348.6; 428/296, 288

[56] References Cited

U.S. PATENT DOCUMENTS

| | | | |
|---|---|---|---|
| 3,692,618 | 9/1972 | Dorschner et al. | 428/296 |
| 4,298,713 | 11/1981 | Morita et al. | 526/348 |
| 4,434,204 | 2/1984 | Hartman et al. | 428/288 |
| 4,554,202 | 11/1985 | Komei et al. | 428/225 |

*Primary Examiner*—James J. Bell
*Attorney, Agent, or Firm*—Stanley M. Teigland

[57] ABSTRACT

Spunbonded nonwoven webs having excellent properties, particularly softness, can be made from linear low density polyethylene having a critical combination of certain key properties. These properties are percent crystallinity, cone die melt flow, die swell, relation of die swell to melt index, and polymer uniformity. The polyethylene is extruded through a spinneret at a temperature between about 185° and 215° C. and drawn through an air gun to form the spunbonded web.

11 Claims, No Drawings

METHOD OF MAKING SPUNBONDED WEBS FROM LINEAR LOW DENSITY POLYETHYLENE

BACKGROUND OF THE INVENTION

Sponbonded nonwoven webs have been produced commercially for many years. As taught in U.S. Pat. No. 3,692,618, they are made by extruding a molten thermoplastic polymer through a spinneret to form an array of closely spaced filaments. The filaments are drawn aerodynamically by means of an air gun (also known as an aspirator jet or a pneumatic jet). Air at a pressure of between about ten and twenty atmospheres is introduced into the air gun to produce a supersonic flow of a column of air that surrounds the filaments and draws them at a rate of between about 3000 and 8000 meters per minute. The drawn filaments are then deposited on a web-forming surface, such as an endless moving belt, where they form a web of entangled continuous filaments lightly bonded at their crossover points. The web may be further bonded, if desired, by passing it through the nip of a pair of heated embossing rolls.

Although prior patents relating to the spunbond process generally teach that any polyolefin may be employed as the thermoplastic polymer, prior to this invention commercially acceptable results were obtained only with polypropylene and high density polyethylene homopolymer as the polyolefin. It would be desirable to form a spunbonded web from a low density polyethylene because of its softer feel, but conventional low density polyethylene does not have adequate melt strenth to form drawn filaments. Linear low density polyethylene (LLDPE) would be expected to provide better results than conventional low density polyethylene, but initial attempts to use LLDPE were not successful because the polymer had inadequate melt strength, i.e., the filaments broke as they were drawn.

SUMMARY OF THE INVENTION

In accordance with this invention, spunbonded nonwoven webs having excellent properties can be made in an efficient process using LLDPE having certain key properties. These properties are percent crystallinity, cone die melt flow, die swell, the relation of die swell to melt index, and polymer uniformity as measured by the breadth of the melting peak.

Percent crystallinity is determined by measuring the enthalpy of fusion using a differential scanning calorimeter. The enthalpy of fusion of the LLDPE employed in this invention is at least 23 calories/gram and preferably is between about 30 and 40 calories/gram. Assuming 100 percent crystalline polyethylene has an enthalpy of fusion of 69 calories/gram, the percent crystallinity of the LLDPE employed in this invention is at least 33 percent and the preferred range is 43 to 58 percent.

The enthalpy is measured at a scan rate of ten degrees Celsius per minute. The integration begins just before the first detectable deviation from the base line and continues until the base line is reached again. After an initial low melting shoulder to the major peak and at between about 100° and 110° C. (corrected for thermal lag) there is an increase in the sloper of the thermogram as the major peak is recorded. The breadth of the melting peak, determined at ten percent of the major peak height, is called the peak width, which is regarded as a measure of the uniformity of polymer branching. The peak width is preferably less than about 25 degrees for the LLDPE employed in this invention.

The calorimetry sample is prepared by extruding the polymer usng ASTM D1238-82, condition 190/2.16, and then conditioning the extrudate in accordance with ASTM D2839-69 before cutting a 6.5 mg section 6 mm from the leading end as the sample. However, I have found that polymers that are undesirably nonuniform will have even broader peak widths if a second scan is obtained after holding the sample in the calorimeter at 160° C. for five minutes and then allowing the sample to cool at 35° C. at five degrees per minute before the peak width is measured again.

Melt index is measured in accordance with ASTM D1238-82, condition 190/2.16. In this invention the melt index of the LLDPE is preferably between about 25 and 40, more preferably between about 30 and 36 grams/ten minutes.

Cone die melt flow is measured in the same manner as melt index except the internal configuration of the die through which the polymer is extruded is in the shape of a cone having an angle of ninety degrees, an exit orifice having a diameter of 2.0955 mm (±0.0051 mm), and an entrance orifice having a diameter equal to the diameter of the die described in ASTM D1238-82. The total load, including the piston, is 775 grams. In this invention the cone die melt flow is preferably between about 65 and 85 grams/ten minutes.

The square of the ratio of the thickness of the filament extruded in the cone die melt flow measurement to the diameter of the orifice through which it was extruded is referred to herein as the die swell. The die swell is measured in accordance with the following method. A tall beaker is placed under the melt indexer so that the top of the beaker is against the melt index cylinder. The beaker contains a silicone fluid, such as Dow Corning 200 fluid, at ambient temperature. The liquid level is 5 cm from the top of the beaker. A cut is made when the second scribe mark of the piston enters the cylinder. Just before the leading end of the strand of the extrudate touches the bottom of the beaker, the beaker is lowered and removed. A second cut may be made fifteen seconds after the first cut, with intervening extrudate being allowed to accumulate. After the strand is removed from the beaker and wiped with a soft towel, its diameter 6 mm from the leading end is measured at five points around the circumference at equal intervals (72°). The five measurements are averaged and divided by the diameter of the exit orifice. This ratio is then squared.

In this invention the die swell of the LLDPE is between about 1.50 and 1.95, preferably between about 1.60 and 1.85. The ratio of the natural logarithm of the die swell to the melt index is between about 0.014 and 0.020, preferably between about 0.016 and 0.017. This ratio is closely related to that which is known in the art as the relaxation time.

As is the case for all polymers used for melt spinning, the properties of the LLDPE, as described above, should not vary substantially throughout the lot.

LLDPE has a molecular structure which is characterized by the substantial absence of long chain branching. In contrast, conventional low density polyethylene has substantial long chain branching. LLDPE also has a significantly higher melting point (typically 120°-135° C.) than conventional low density polyethylene (typically 105°-115°). Conventional low density polyethylene is sometimes referred to as high pressure polyethylene because it is produced at high pressures. LLDPE, on the other hand, is produced commercially at low pressures in a gas phase process. However, LLDPE may also be produced in a liquid phase solution process. Various alpha-olefins are typically copolymerized with ethylene in producting LLDPE. The alpha-olefins, which preferably have 4 to 8 carbon atoms, are present in the polymer in an amount of up to about ten percent by weight. The most typical comonomers are butene, hexene, 4-methyl-1-pentene, and octene. The comonomer influences the density of the polymer, which is preferably less than about 0.955 grams per cubic centimeter.

In forming the spunbonded web in accordance with this invention, the LLDPE is preferably extruded at a temperature between about 185° and 215° C., more preferably between about 190° and 205° C.

The following example represents the best mode contemplated for practicing the invention.

EXAMPLE

Spunbonded nonwoven webs are made from LLDPE (copolymer of ethylene and octene) having a die swell of 1.72, a cone die melt flow of 72, a melt index of 32, an enthalpy of fusion of 36 calories/gram (corresponding to a percent crystallinity of 52), and a density of 0.949. The ratio of the natural logarithm of the die swell to the melt index is 0.0169. The LLDPE is extruded at a temperature of about 200° C. through a spinneret to form an array of closely spaced filaments. The spinneret has 756 orifices, each of which has a diameter of 0.6 mm. The mass flow rate is about 1.25 grams/minute/orifice. The extruded filaments are drawn by air guns (draw nozzles) as shown in U.S. Pat. No. 4,322,027 at a rate of 4020 meters per minute. The air gun is operated at a pressure of about eleven atmospheres. The filaments are deposited on a moving endless belt to form a spunbonded web of continuous filaments. The web has excellent properties, particularly hand, softness and drape.

I claim:

1. In the method of forming a spunbonded nonwoven web of continuous polyolefin filaments by extruding the polyolefin at a temperature above its melting point through a spinneret to form filaments of the polyolefin, drawing the filaments with an air gun, and depositing the filaments on a web-forming surface to form the nonwoven web, the improvement wherein the polyolefin is a linear copolymer of ethylene and an ethylenically unsaturated alpha-olefin having 4 to 8 carbon atoms, the copolymer having a percent crystallinity of at least 33 percent, a cone die melt flow of between about 65 and 85 grams/ten minutes, and a ratio of the natural logarithm of die swell to melt index of between about 0.014 and 0.020, and wherein the copolymer is extruded at a temperature between about 185° and 215° C.

2. The improvement of claim 1 wherein the copolymer has a degree of cystallinity between about 43 and 58 percent.

3. The improvement of claim 1 wherein the percent crystallinity is determined by measuring the enthalpy of fusion.

4. The improvement of claim 3 wherein the enthalpy of fusion is between about 30 and 40 calories per gram.

5. The improvement of claim 1 wherein the copolymer has a melt index between about 25 and 40 grams/ten minutes.

6. The improvement of claim 1 wherein the copolymer has a melt index between about 30 and 36 grams/ten minutes.

7. The improvement of claim 1 wherein the copolymer has a die swell between about 1.60 and 1.85.

8. The improvement of claim 1 wherein the copolymer has a density less than about 0.955.

9. The improvement of claim 1 wherein the copolymer has a die swell between about 1.50 and 1.95.

10. The improvement of claim 9 wherein the copolymer has a peak width of less than about 25 degrees.

11. In the method of forming a spunbonded nonwoven web of continuous polyolefin filaments by extruding the polyolefin at a temperature above its melting point through a spinneret to form filaments of the polyolefin, drawing the filaments with an air gun, and depositing the filaments on a web-forming surface to form the nonwoven web, the improvement wherein the polyolefin is a linear copolymer of ethylene and an ethylenically unsaturated alpha-olefin having 4 to 8 carbon atoms, the copolymer having a percent crystallinity as determined from enthalpy of fusion of between about 43 and 58 percent, a cone die melt flow between about 65 and 85 grams/ten minutes, a die swell between about 1.50 and 1.95, a melt index between 25 and 40grams/ten minutes, a ratio of the natural logarithm of the die swell to the melt index between about 0.014 and 0.020, a peak width of less than about 25 degrees, and wherein the copolymer is extruded at a temperature between about 185° and 215° C.

* * * * *